INVENTOR.
THOMAS N. BRIDGES, SR.
Agent

INVENTOR.
THOMAS N. BRIDGES, SR.

United States Patent Office 3,350,774
Patented Nov. 7, 1967

3,350,774
SEALANT APPLYING APPARATUS
Thomas Nelson Bridges, Sr., Marietta, Ga., assignor to Lockheed Aircraft Corporation, Burbank, Calif.
Filed Apr. 25, 1966, Ser. No. 545,101
8 Claims. (Cl. 29—564)

This invention relates generally to techniques in making connections, especially those involving metal parts, in high speed production operations or assemblies, and more particularly to an apparatus by which a sealant is applied in such connections to prevent air and water leakage therethrough, as well as for anti-corrosion purposes.

Fasteners are often required to be installed with some type of sealing. The application of a sealant in fluid or viscous form into the aligned openings in the parts to be joined at or immediately prior to insertion and tightening of the fastener has been used successfully to meet this requirement.

Furthermore, in high speed production operations automatic machines have been employed which engage and clamp the parts to be joined. While thus held tightly together, the several operating attachments comprising the machine sequentially drill a series of holes therein, countersink each where required, insert a fastener in each hole, secure the fastener, and release and unclamp the parts. In order to introduce sealing to this automated system, it becomes necessary to rework the machine by incorporating means to apply a sealant prior to installation of each fastener so that when the fastener is installed it is surrounded by the sealant. This unduly interrupts the normal cycle of the machine unless the sealant applying step is completed substantially within the relatively brief interval between the drilling and fastener inserting operation. At the same time, it is important that the sealant be properly applied in the hole, i.e., totally cover the surfaces of the parts and yet not in an excessive manner so as to require an unreasonable clean up time, which would defeat high speed performance, the very purpose of the machine.

The present invention is therefore directed to the above and other considerations. In simplest terms, this invention proposes a sealant applying apparatus for existing automatic fastener machines to accomplish sealing as an integrated step in the operation of such machine without delaying the normal operating cycle thereof. This apparatus is such that it may be provided as a kit adapted to be attached to the existing machine and operatively connected to its control mechanism without affecting its operation. Thus, the apparatus herein proposed is actuated and controlled by and in response to sequential operations of the existing machine which is operatively unencumbered by its addition thereto.

More specifically the instant apparatus includes a sealant ejector adapted to release a predetermined, metered quantity of sealant in a uniform manner for application to the surfaces of the parts to be joined and a mount for such ejector whereby it is precisely located with respect to the parts when the sealant is being applied. This mount normally disposes the sealant ejector adjacent to each successive hole as it is being made, and yet totally clear of the drilling and fastener installing devices of the machine. Upon completion of the drilling operation, the mount instantaneously actuates to transfer the ejector toward the hole initially moving it in a generally parallel plane relative to the parts or workpieces and then perpendicular thereto. This substantially ninety degree change in direction permits the movement of the ejector in such a way as to avoid adjacent machine structure with a minimum vertical stroke. Thus, it is possible to position and remove the ejector for proper application of the sealant onto the parts between the normal drilling and fastening operations of the machine.

With the above and other objects in view as will be apparent, this invention consists in the construction, combination and arrangement of parts all as hereinafter more fully described, claimed and illustrated in the accompanying drawings wherein:

Figure 1:
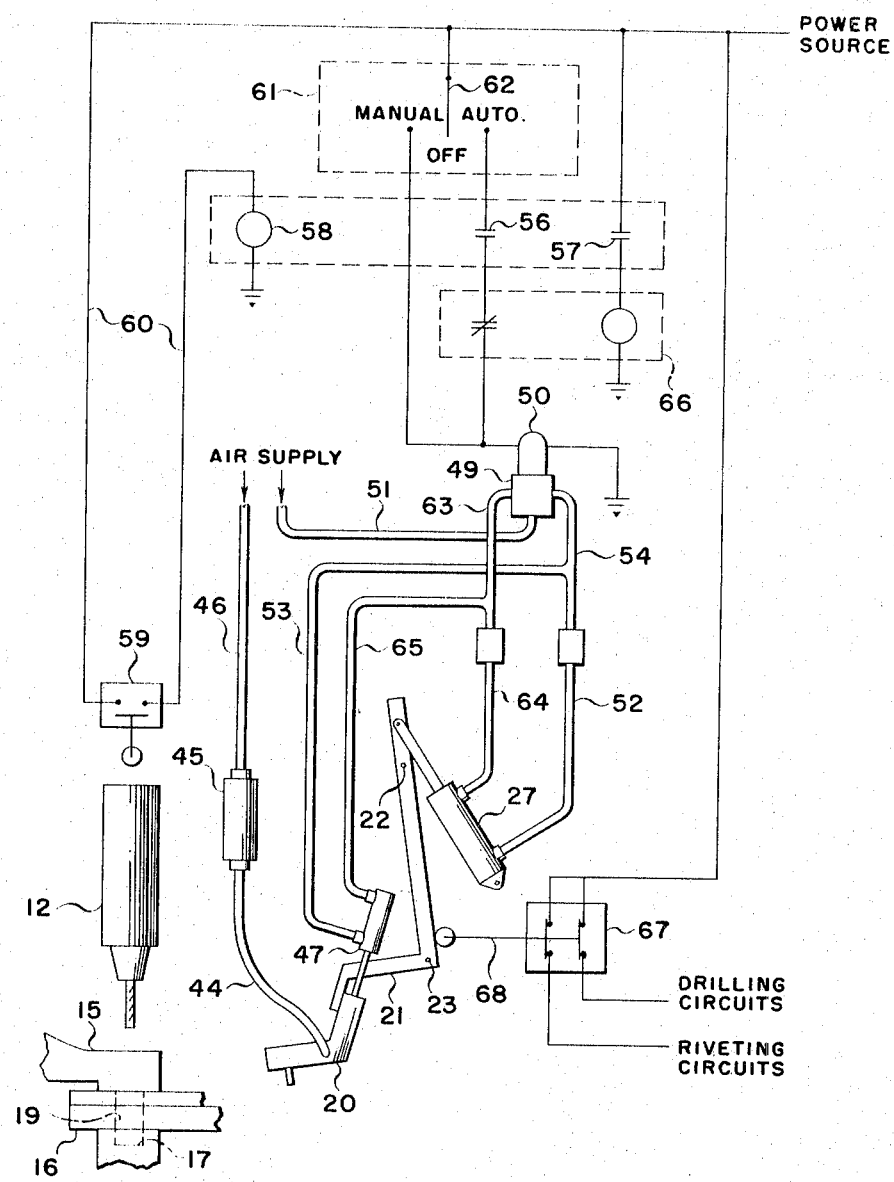
FIGURE 1 is a general schematic view of a sealant ejector and its mounting and operating mechanism including the controls therefor as it would be associated with the existing components of conventional automatic machines, portions of the parts to be secured being shown in the machine and the ejector located in its inoperative position.

Referring more particularly to the drawings, 10 designates generally the body portion of an automatic fastener machine having a relatively movable carriage 11 on which a drill 12 and a riveter 13 with a feed attachment 14 are mounted. The machine 10 includes a pressure pad 15 adapted to rest adjacent the upper surface of a pair of abutting parts or sheets 16 to be joined. A corresponding member 17 contacting the under surface of such sheets 16 acts in opposition to the pad 15 under an application of pressure whereby the sheets 16 are clampingly engaged in an immovable position.

The pad 15 includes a central opening 18 for the passage therethrough in sequence of the drill 12 and the riveter 13. To this end, both the drill 12 and riveter 13 are mounted for relative vertical movement by suitable drive means. Electrical control circuitry (not shown) is provided to actuate the drill 12 to produce a fastener opening 19 in the sheets 16, retract the drill 12, and move the carriage 11 linearly to align the riveter 13 with the opening 18 and fastener opening 19 just produced. At this time, a rivet is deposited in the opening 19 and secured or bucked by conventional operation of the riveter 13 and associated parts of the machine. Subsequently, movement of the carriage 11 disposes the drill 12 and riveter 13 in position for the next adjacent hole and the procedure is repeated the desired number of times.

The sealant applying apparatus herein proposed is designed and constructed to form an integral part of the machine 10 removably attached thereto and coordinated with the operation thereof so as to apply sealant in each opening 19 after it is made in the sheets 16 by the drill 12 and prior to the deposit of a rivet therein. In thus operating, the timing of the machine 10 need not be altered and the high speed production rate may be maintained.

To the above ends, a sealant ejector 20 is operatively connected to the machine 10 being attached to one end of a mount 21 pivotally connected at selected, spaced points 22 and 23 medially of its length to links 24 and 25 respectively. At its other end each link 24 and 25 is hinged to a fitting 26 adapted to be anchored to some convenient part of the machine 10 in any conventional manner. The mount 21 is appropriately connected at its opposite end to one end of an actuator such as a power cylinder 27 anchored at its other end through a fitting 26 to the machine 10. Thus connected to the machine 10, the mount 21 disposes the ejector 20 at all times in the plane of the longitudinal center line of the opening 18.

Figure 2:
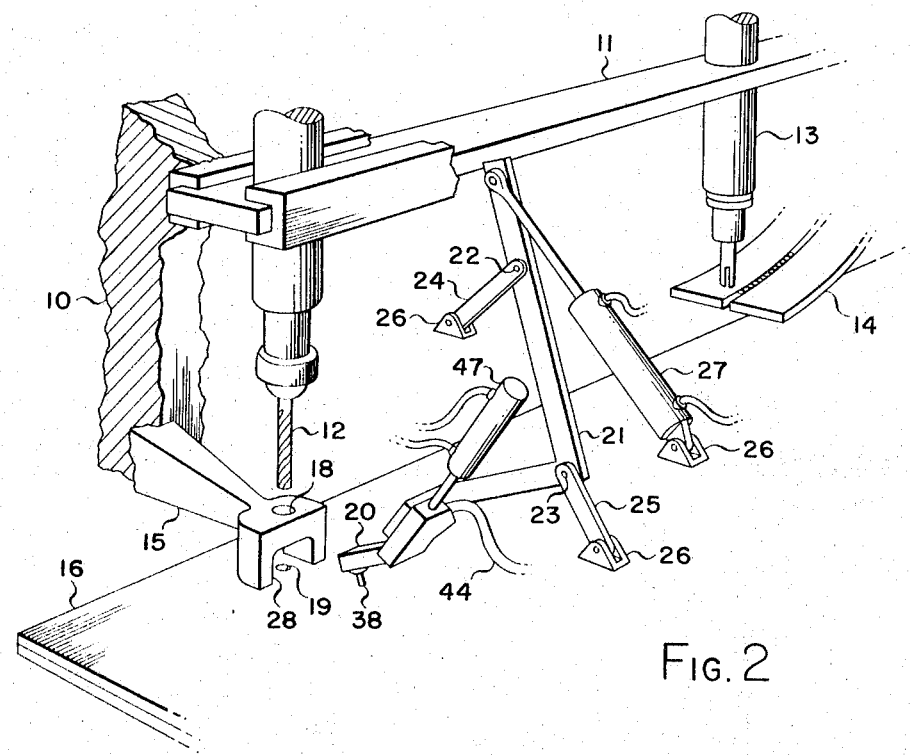
FIGURE 2 is an isomeric view of that part of the machine and mechanism illustrated in FIGURE 1 in the area of the sealant ejector showing in greater detail the operating linkage therefor and the mounting and relative positions of the drilling and fastener installing components of the machine.
Figure 3:
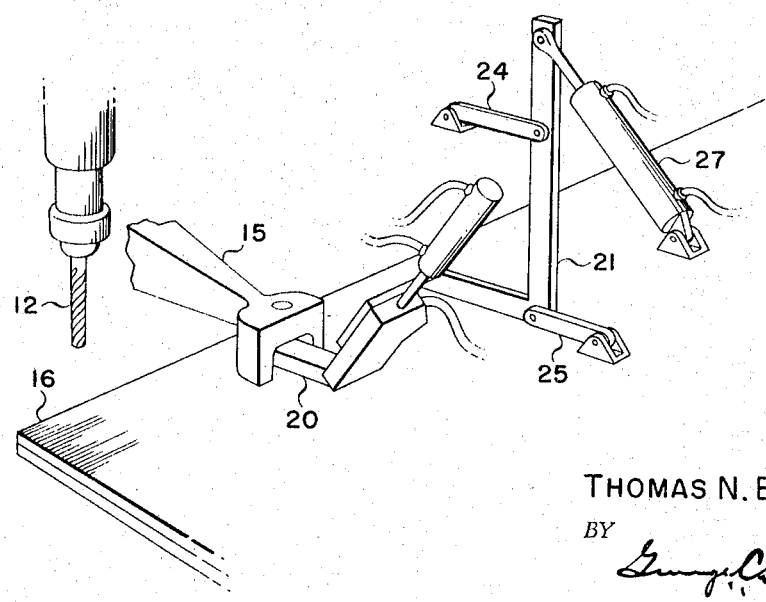
FIGURE 3 is a similar view showing the sealant ejector in the operative position while the drilling and fastener installing assembly is moving or stepping to the next position, only a fragment of this assembly being shown.
Figure 4:
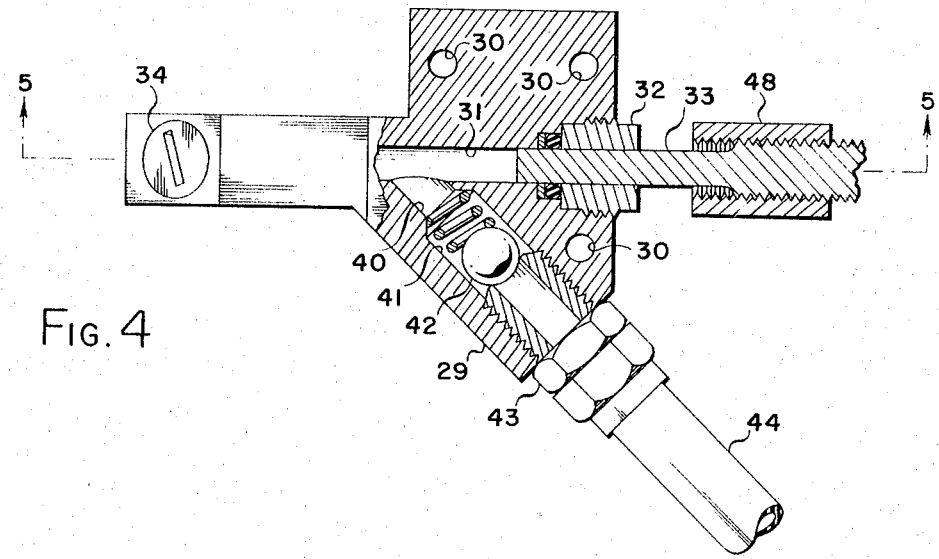
FIGURE 4 is a top view of the sealant ejector and its operating mechanism with parts broken away to show the means whereby a metered predetermined quantity of sealant is released onto the surfaces of the sheets to be joined.
Figure 5:
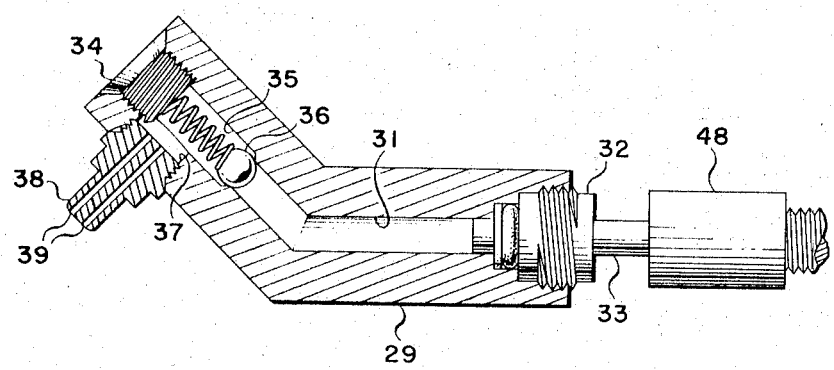
FIGURE 5 is a section taken along line 5—5 of FIGURE 4.

At the same time, the links 24 and 25 and their relative locations with respect to the mount 21 are such that operation of the actuaor 27 moves the ejector 20 in a path indicated by the arrow in FIGURE 1. Such path locates the ejector 20 in extreme positions remote from and totally clear of the pressure pad 15 (FIGURES 1 and 2) and in axial alignment with the opening 18 therein. In the latter position the ejector 20 seats within the opening 19 in the sheets 16.

In order to permit the above movement of the ejector 20, a cutout 28 is formed or otherwise provided in the foot 15 and the path of movement of the ejector 20 is such as to allow it to pass through the cutout 28. In this regard it is to be noted that the path of the ejector 20 in moving from the remote or inoperative position to the operative position within the opening 19 is generally horizontal and then generally vertical. This maintains the clearance space required for its total operation to a minimum while the speed thereof is at a maximum.

The sealant ejector 20 is formed by a housing 29 provided with suitable attachment means 30 for its immovable connection to the mount 21. Centrally, it is bored, as at 31, with the opposite ends thereof being enlarged and internally threaded to receive on the one hand a bushing 32 through which a plunger 33 is adapted to pass and on the other hand closure means such as a tap screw 34. Adjacent the screw 34, the bore 31 is enlarged to create a chamber 35 in which a valve 36 is adapted to be mounted, the base of the enlargement or chamber 35 being formed to constitute a seat for the valve 36. A tap hole 37 pierces the wall on one side of the housing 29 communicating with the outer end of the chamber 35 and nozzle means 38 is appropriately mounted, as by threading, in this hole 37. The nozzle 38 is of conventional design having one or more longitudinal passages 39 each of predetermined transverse size consistent with the sealant and quantity to be passed therethrough.

The housing 29 is additionally tapped or bored, as at 40, from one side thereof into the bore 31, and the other end is enlarged to create a chamber 41 to accommodate a standard check valve 42 and fitting 43 for the connection thereto of a feed line 44 from a sealant tank 45. The end of the fitting 43 within the chamber 41 constitutes a seat for the valve 42. A source of fluid pressure is connected to the tank 45 through suitable means including a conduit 46, and when operative, forces sealant from the tank 45 and eventually into bore 31 overpowering the check valve 42. Relief valve 36, however, is designed to withstand this force and the sealant thus delivered into and filling the bore 31 is not allowed to pass into the chamber 35 and out the nozzle 38.

When it is desired to eject sealant through the nozzle 38, movement of the plunger 33 serves to overcome the relief valve 36 and force the sealant in bore 31 through the nozzle 38 since check valve 42 prevents a return of the sealant into line 44. To this end, the plunger 33 is power-driven by an actuator such as, for example, a fluid cylinder 47. If desired, the effective stroke of the plunger 33 may be adjusted by a variable stop 48 mounted externally thereof and operative against the bushing 32 to establish and maintain the length of penetration of the plunger 33 in the bore 31.

The operation of the actuators 27 and 47 is controlled by a four-way valve 49 which may be electrically actuated, as for example by solenoid 50. Normally the valve 49 connects fluid pressure from a suitable source through a line 51 via a common connector 54 simultaneously to lines 52 and 53 connected to one end of the actuators 27 and 47 respectively. Actuator 27 is thereby extended causing the sealant ejector 20 to be moved to and held in its inoperative position, while actuator 47 is contracted withdrawing plunger 33 from the bore 31. At this time the relief valve 36 is closed blocking discharge of sealant through the nozzle 38. As the plunger 33 is withdrawn from the bore 31, however, sealant is again delivered under pressure in the line 46 from the tank 45 into and filling the bore 31 where it is ready to be ejected therefrom through the nozzle 38 as before upon operation of the plunger 33.

The foregoing operation is coordinated with the existing sequential operation of the machine 10 through electrical circuitry between the drill 12 and solenoid 50. This circuitry includes a pair of normally open contacts 56 and 57 and a control therefor in the form of a relay coil 58 with a switch 59 connecting it to power through a conductor 60. The switch 59 is responsive to the operation of the drill 12, being adapted to close upon withdrawal of the drill from the sheets or workpieces 16 after producing each hole 19 therein.

The solenoid 50 is connected to the conductor 60 and hence to power through a manually-operated control 61 which may be located at some convenient place with respect to the machine 10 for ready access by the technician or operator. This control 61 includes a contact arm 62 having "off," "manual," and "automatic" positions at the selection of the operator. When the selector arm 62 is moved to the "manual" position, a connection is established between power and the solenoid 50 for movement of the valve 49 disconnecting the pressure line 51 from feed line 54 annd concurrently connecting pressure line 51 to feed line 63 common to the lines 64 and 65 connected to the ends of actuators 27 and 47 in opposition to lines 52 and 53 respectively. Thus, the actuator 27 is contracted moving the sealant ejector 20 to its operative position within the fastener opening 19. At the same time, the actuator 47 is extended forcing sealant past the relief valve 36 for ejection through nozzle 38.

When the selector arm 62 is moved to the "automatic" position, connection is established between power and the solenoid 50 to effect a similar operation. However, the normally open contacts 56 are located in the line between the control 61 and solenoid 50 and unless and until these contacts 56 have been closed by actuation of the switch 59 the solenoid 50 is not energized. In addition, a time-delay relay 66 is operatively connected in the line between the contacts 56 and solenoid 50 with a constant connection to power through the contacts 57. Thus, when the contacts 56 and 57 are closed by operation of the switch 59, with the contact arm 62 in the "automatic" position, the ejector 20 operates as described for a period determined by the setting of the time-delay relay 66. Upon completion of such operation the solenoid is de-energized effecting the disconnection of pressure line 51 from lines 64 and 65 and the concurrent connection thereof to lines 52 and 53. The actuators 27 and 47 are thereby returned to their normal positions with the ejector 20 disposed in the inoperative position. This cycle is automatically repeated each time the drill 12 is retracted and the switch 59 closed thereby.

As a safety measure to prevent any possible conflict in the operation of the sealant applying apparatus as described and the drilling and fastener installing operations, additional switch means 67 is operatively incorporated in the circuitry of the machine 10. This switch 67 is connected in the circuit between power and the actuators for the drill 12 and riveter 13 being provided with a contact element 68 responsive to movement of the mount 21. The operation is such that when the mount 21 is disposed in its inoperative position switch 67 is closed and the drilling and riveting circuits are energized. Whenever the mount 21 moves out of the inoperative position, however, it releases the contact 68 opening the switch 67 whereby the drilling and riveting circuits are broken.

It is to be understood that the foregoing disclosure is illustrative of a preferred embodiment of the invention. Various changes and modifications to this embodiment will suggest themselves to those skilled in the art without departing from the spirit and scope of the invention as set forth in the appended claims which alone defined the true limitations of the invention.

What is claimed is:

1. A sealant applying apparatus adapted to be operatively connected to an automatic fastener machine having drilling and fastener installing attachments and a control system for the coordinated operation thereof whereby parts delivered to the machine are sequentially provided with at least one set of aligned holes, a fastener inserted in each set of said holes and tightened securing the parts one to another, comprising a sealant ejector operative to release predetermined amounts of sealant, a mount for said ejector, power means connected to said mount and operative to move it to and from extreme positions locating said ejector proximate and remote from said holes, a control for said power means responsive to movement of said drilling attachment whereby said power means operates upon the completion of operation of said drilling attachment and prior to the operation of said fastener installing attachment, and an actuator for the operation of said ejector when disposed in the position proximate said holes.

2. The apparatus of claim 1 including a connection between said mount and said machine for movement of the former relative to the latter from said remote position to said proximate position passing initially in a plane generally parallel to said parts and then generally perpendicular to said parts.

3. The apparatus of claim 2 wherein said connection includes a pair of links pivotally connected at corresponding ends to said mount at spaced locations medially in the length thereof.

4. The apparatus of claim 1 including a connection between said actuator and said power means control whereby the operation thereof is coordinated.

5. The apparatus of claim 1 including a shutoff for said control system responsive to movement of said mount out of its remote position aforesaid rendering said drilling and fastener installing attachments inoperative.

6. The apparatus of claim 4 wherein said connection includes a valve common to said power means and said actuator, operable by the power means control aforesaid.

7. The apparatus of claim 1 wherein said sealant ejector includes a housing, a chamber within said housing, a one-way sealant flow to said chamber, a nozzle from said chamber, a plunger operative in said chamber in response to the actuator aforesaid, and a relief valve in said chamber adjacent said nozzle to prevent the passage of sealant thereto, said relief valve being opened upon operation of said plunger.

8. The apparatus of claim 7 including an adjustment to regulate the stroke of said plunger whereby the amount of sealant ejected by said nozzle is controlled.

References Cited
UNITED STATES PATENTS

| | | | |
|---|---|---|---|
| 2,109,327 | 2/1938 | Barrett | 29—26.1 |
| 2,216,403 | 10/1940 | Oeckl | 29—34.2 |
| 2,488,645 | 11/1949 | Speller | 29—26.1 |
| 2,652,942 | 9/1953 | Muchy | 29—34.2 |

RICHARD H. EANES, JR., *Primary Examiner.*